US006914240B2

(12) United States Patent
Giles et al.

(10) Patent No.: US 6,914,240 B2
(45) Date of Patent: Jul. 5, 2005

(54) MULTI-INLET MASS SPECTROMETER

(75) Inventors: Roger Giles, Holmfirth (GB); Alexander Makarov, Cheadle (GB); Lee Martin Earley, Manchester (GB)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 10/333,867

(22) PCT Filed: Jul. 26, 2001

(86) PCT No.: PCT/GB01/03368

§ 371 (c)(1),
(2), (4) Date: Jan. 25, 2003

(87) PCT Pub. No.: WO02/08724

PCT Pub. Date: Jan. 31, 2002

(65) Prior Publication Data

US 2004/0011951 A1 Jan. 22, 2004

(30) Foreign Application Priority Data

Jul. 26, 2000 (GB) ............................................ 0018344

(51) Int. Cl.[7] .......................... B01D 59/44; H01J 49/40
(52) U.S. Cl. ........................ 250/285; 250/300; 250/281
(58) Field of Search ................................ 250/288, 287, 250/285, 281, 300

(56) References Cited

U.S. PATENT DOCUMENTS 5,623,144 A * 4/1997 Yoshinari et al. ........... 250/281
5,668,370 A 9/1997 Yano et al.
5,825,026 A 10/1998 Baykut
5,959,396 A * 9/1999 Moreshead et al. ...... 313/363.1
6,066,848 A * 5/2000 Kassel et al. ............... 250/288
6,350,617 B1 * 2/2002 Hindsgaul et al. .......... 436/173
6,410,914 B1 * 6/2002 Park et al. .................. 250/288
6,657,191 B2 * 12/2003 Park .......................... 250/288

FOREIGN PATENT DOCUMENTS

| | | | |
|---|---|---|---|
| EP | 0 285 408 | A2 | 10/1988 |
| EP | 0 966 022 | A2 | 12/1999 |
| EP | 0966022 | A | 12/1999 |
| GB | 2355108 | A | 4/2001 |
| GB | 2 356 285 | A | 5/2001 |
| GB | 2 358 280 | A | 7/2001 |
| WO | WO 98/53308 | A | 11/1998 |
| WO | WO 99/13492 | A | 3/1999 |
| WO | WO 99/19899 | A | 4/1999 |
| WO | WO 99/50667 | A1 | 10/1999 |
| WO | WO 01/44795 | A | 6/2001 |
| WO | WO 01/44795 | A2 | 6/2001 |

OTHER PUBLICATIONS

Analytical Chemistry, vol. 73, 2000, pp. 20–24.

* cited by examiner

*Primary Examiner*—John R. Lee
*Assistant Examiner*—Kalimah Fernandez
(74) *Attorney, Agent, or Firm*—Haynes and Boone, LLP

(57) ABSTRACT

A mass spectrometer has an ion source (10) with a plurality of atmospheric pressure sample ioniser (20) mounted in a front face (15) thereof. Each sample ioniser (20) extends into a corresponding sample region (30) and the tip of each sample ioniser is mounted at right-angles to a corresponding one of a plurality of entrance cones (50) each having an entrance orifice (40) therein. Each entrance cone (50) in turn opens into an inlet channel having first and second parts (60, 70). The two parts of the inlet channel are separated by an electrical gate (65). The inlet channels corresponding to each entrance cone (50) all merge into a common exit channel (90) to a mass spectrometer. By appropriate operation of the gates (65) dividing the inlet channels, rapid switching between the samples that are analysed in the mass analyser can be achieved.

29 Claims, 3 Drawing Sheets

MULTI-INLET MASS SPECTROMETER

This application claims benefit, under 35 U.S.C. 371, of Patent Cooperation Treaty PCT/GB01/03368, filed Jul. 26, 2001, which claims benefit of Great Britain priority application Number 0018344.2, filed Jul. 26, 2000.

FIELD OF THE INVENTION

The present invention relates to an ion source for a mass spectrometer, in particular of the type adapted to provide a source of sample ions at atmospheric pressure.

BACKGROUND TO THE INVENTION

Mass spectrometers have been used to analyse a wide range of materials, including organic substances such as pharmaceutical compounds, environmental compounds and biomolecules. They are particularly useful, for example, for DNA and protein sequencing. In such applications, there is an ever increasing desire for faster speed of analysis of sample ions by the mass spectrometer while still producing accurate measurements of the mass/charge ratios of the ions in question.

Some steps towards increasing the speed of analysis of mass spectrometers have been taken by increasing the number of inlets to the mass spectrometer. For example, in Analytical Chemistry 2000, 72, pages 20–24, L. Jiang and M. Moini describes a dual- or quad-orifice mass spectrometer which receives sample ions from two or four electrospray ionisation sources respectively. In this way, several streams of sample ions can be analysed simultaneously and furthermore a stream of reference ions can be introduced into the mass spectrometer at the same time as the stream of sample ions, enabling more accurate readings.

An alternative arrangement is shown in EP-A-0,966,022. A mass spectrometer is shown having a single sampling orifice for receiving ions and a plurality of sample ion sources. The sampling orifice is connected to a sample selector with at least one aperture. Each ion source generates a jet of ions directed towards the sample selector which may rotate to align an aperture with any one of the jets. In this manner any one of a number of different jets of sample ions to be analysed may enter the sample selector, pass through the sampling orifice and into the mass spectrometer.

U.S. Pat. No. 6,066,848 provides, in a first embodiment, an ion source having a plurality of sample ionisers and in which a rotatable disc having a small hole is provided adjacent the inlet orifice of a mass spectrometer. Rotation of the disc allows a selected one of the streams of sample ions to enter the analyser. In a second embodiment, the disc is stationary and is provided with number of shutter valves which may be individually opened or closed to permit one of the streams of sample ions to enter the analyser.

The prior art mass spectrometers described above all suffer from various drawbacks. For example, in the case of the arrangement described by Jiang and Moini, providing a plurality of orifices leading into the mass spectrometer requires extra pumps to maintain a suitably low pressure within the mass spectrometer, especially with the quad-nozzle arrangement. In the case of the devices shown in EP-A-0,966,022 and the first embodiment of U.S. Pat. No. 6,066,848, the rotating sample selectors are both cumbersome, slow to react, and also difficult to engineer reliably. Finally, none of these devices are particularly fast in switching from one sample stream to the next.

It is an object of the present invention to address these problems with the prior art.

SUMMARY OF THE INVENTION

Accordingly, in a first aspect of the present invention there is provided an ion source for a mass spectrometer which operates at low pressure, the ion source comprising: a plurality of atmospheric pressure sample ionisers operative at relatively higher pressure to provide a plurality of streams of sample ions; an interface chamber, operable at a pressure intermediate atmospheric pressure and the operating pressure of the mass spectrometer, having a plurality of entrance orifices located at a first position to collect sample ions into the interface chamber from said streams of sample ions and an exit orifice at a second position downstream of the said first position of the entrance orifices, for said sample ions to exit the interface chamber to the mass spectrometer, the interface chamber defining a plurality of separate ion paths for ions to travel between a respective one of the entrance orifices and the exit orifice; and ion control means, located downstream of the said entrance orifices, and arranged selectively to prevent ions from passing along a chosen one or ones of the ion paths to the mass spectrometer.

By providing an ion source having a plurality of entrance orifices to the interface chamber, it is possible to separately analyse any one of a number of different streams of sample ions, such as protein molecules or DNA fragments. Furthermore, as the sample ionisers may each be constantly producing a stream of sample ions, it is possible to rapidly switch to and analyse the next stream of sample ions simply by 'closing' the, or part of the, ion control means and 'opening' another part thereof. This increases the rate at which a large number of samples may be analysed, and greatly increases the speed of analysis with a single mass spectrometer.

Either one or any multiple combinations of the plurality of streams of sample ions may be admitted to the mass spectrometer for simultaneous study. A further advantage of the present invention becomes apparent when more than one stream of sample ions is admitted to the mass spectrometer: as the sample ions only mix within the interface chamber which is at a pressure lower than atmospheric pressure, the chance of collision and, as a result, the rate of chemical reaction between the different sample ions is greatly reduced. This ensures that the mass spectrometer receives as few unwanted or unexpected chemical compounds as is possible and produces accurate results.

In order for a stream of sample ions to enter the interface chamber, it must each pass through one of the entrance orifices. As a result, there are fewer sample ions and, more importantly, fewer unwanted chemical compounds within the interface chamber than in the region immediately surrounding the sample ioniser. By providing the ion control means, or ion blocking means, downstream of the entrance orifices, therefore, they are less likely to become clogged or otherwise damaged by the unwanted chemicals entrained within the sample stream.

In another preferred embodiment, during use of the ion source, the interface chamber is maintained at a pressure intermediate atmospheric pressure and the operating pressure of the mass spectrometer. This further increases the speed of analysis by the mass spectrometer as the ion control means are arranged downstream of the entrance orifices of the interface chamber. The ion streams thus encounter the ion control means in a region of relatively low pressure. In this region, the sample ions travel at substantially greater speeds than in the relatively higher pressure region immediately surrounding the sample ioniser. As a result, when the, or part of the ion control means is 'closed', and another part 'opened', the time required for the next stream of sample ions to reach the mass spectrometer is reduced. The relaxation time between one stream and the next may be thus reduced by a factor of ten compared to the prior art (10 ms as compared to the 100 ms for the system described in EP-A-0,966,022).

In one preferred embodiment, the ion control means includes gating means which, when open, permits passage of a selected one or ones of streams of sample ions to the mass spectrometer, the gating means being provided within the interface chamber between the said first and second locations. In that case, preferably, the gating means comprises an electromagnetic field generator arranged selectively to generate an electromagnetic field which deflects the selected one or ones of the streams of sample ions so as to prevent the or each said stream of sample ions from entering the mass spectrometer. In a particularly preferred embodiment, the electromagnetic field generator generates a static electric field. Non-mechanical switching provides a further speed advantage over the prior art. Not only that, but electrical gates are more reliable and easier to install into present systems. For example, a pair of electrodes generating an electric field may be placed around the interface chamber. Deflection of sample ions may thus be achieved without major modification to the interface chamber. Furthermore, electrical gates are cleaner and also easier to keep clean than their mechanical equivalents. For example, the stream of sample ions may well contain other, unwanted chemicals such as solutes and buffers, and these can collect onto and clog mechanical gates. This forces regular cleaning of the gates, or otherwise reduces their lifespan. Also, these unwanted chemical deposits may later break free from the gate, contaminating other sample flows.

In an alternative embodiment, the ion control means comprises ion trapping means arranged selectively to prevent ions entering it from exiting therefrom. In that case, the interface chamber defines a plurality of interface channels each in communication with a corresponding one of the entrance orifices, each interface channel in turn constraining a corresponding one of said streams of sample ions to follow a corresponding one of the said ion paths, preferably.

Most preferably, the ion trapping means comprises a plurality of ion storage devices, such as for example rf multipole storage devices, each being arranged to recieve a stream of sample ions from a corresponding one of the said seperate ion paths and selectively to trap the received stream therein for future ejection to the exit orifice on demand.

Using ion traps to store the ions arriving from multiple sources provides yet a further improvement in device duty cycle, particularly when non-electrospray sources are employed.

In yet a further preferred embodiment at least one of the plurality of sample ionisers provides a stream of ions for calibrating the mass spectrometer, the stream of ions for calibrating the mass spectrometer being admitted to the mass spectrometer simultaneously with at least one other of the streams of sample ions. By admitting a stream of sample ions to the mass spectrometer, either sequentially or simultaneously with a stream of calibration ions, on-line calibration can be provided and the accuracy of the mass spectrometer increased. Furthermore, as the two streams of ions mix only within the relatively lower pressure region of the interface chamber, fewer chemical reaction will occur between the component ions than in the ion source of the prior art.

It is to be understood that whilst a separate, distinct sample may be fed to a respective one of the plurality of ionisers, any combination of samples may in fact be used. In particular, it may be beneficial for sensitivity improvement to split the same sample into two or more ionisers, for feeding to two or more separate channels.

In another preferred embodiment of the present invention, the interface chamber is arranged in fixed relation to the sample ionisers. Previous ion sources (such as EP-A-0,966,022) have included an interface chamber which rotates relative to the sample ionisers in order to select the required stream of sample ions. The present invention, by providing a fixed interface chamber, provides a system which is more reliable and easier to engineer.

In another aspect, the present invention provides a method of analysing sample ions from at least one of a plurality of simultaneously operating atmospheric pressure sample ionisers, the method comprising: generating a stream of sample ions from each of a corresponding one of the plurality of atmospheric pressure sample ionisers; directing each stream towards a corresponding one of a plurality of entrance orifices in an interface chamber, maintained at a pressure below atmospheric pressure, for selective direction through the interface chamber towards a mass spectrometer; and selectively blocking at least some of said streams of sample ions from passing through said exit orifice of said interface chamber into the mass spectrometer after said selected one or ones of said streams of sample ions have entered said interface chamber.

Further advantageous features are set out in the dependent claims attached hereto.

BRIEF DESCRIPTION OF THE FIGURES

One embodiment of the present invention will now be described by way of an example only and with reference to the accompanying drawings in which.

DETAILED DESCRIPTION OF THE PREFERRED EMBODIMENT

Figure 1:
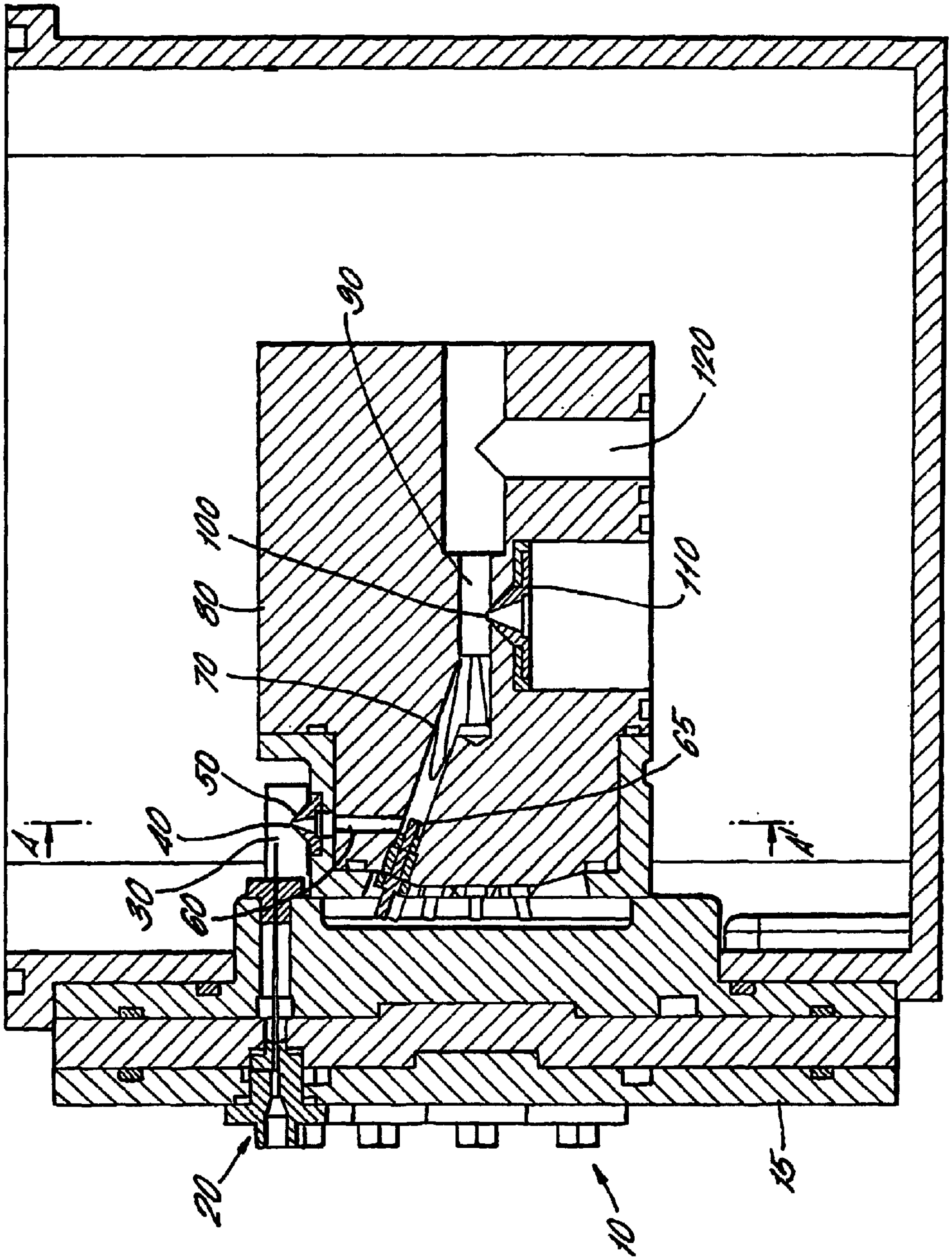
FIG. 1 shows a side cross-sectional view of an ion source embodying the present invention.

Referring first to FIG. 1, an ion source, generally indicated at 10, is shown.

The ion source 10 has a front face 15 and includes a plurality of atmospheric pressure sample ionisers 20, mounted therein. A variety of different ionisers are suitable, such as an electrospray ion source, an atmospheric pressure chemical ionisation (APCI) ion source or a matrix-assisted laser desorption/ionisation (MALDI) ion source. As will be familiar to those skilled in the art, the ioniser 20 is provided with a flow of solvent containing a sample to be analysed. Typically, this flow is produced by separating the sample molecules by liquid chromatography or capillary electrophoresis. However, other techniques such as fast liquid chromatography and capillary electrochromatography can be used as well.

Each ioniser 20 extends into a corresponding sample region 30, which is again at or around atmospheric pressure. The sampling region 30 is defined between the end of each ioniser 20 and an entrance orifice 40 in an entrance cone 50. As will be understood, the tip of each ioniser is arranged at right-angles to the entrance orifice of the corresponding entrance cone 50, so that sample ions and entrained solvent molecules are not forced directly into the entrance orifice 40.

Each entrance cone 50 communicates with a corresponding inlet channel which has a first part 60 and a second part 70 defined in an interface chamber 80. The first part 60 of the inlet channel meets the second part 70 of the inlet channel at an oblique angle as may be seen in FIG. 1. At the junction between the two parts of each inlet channel is an electrical gate 65, whose purpose will be described in detail below.

Each inlet channel opens into a common exit channel 90, also defined in the interface chamber 80. Adjacent to the common exit channel 90 is an exit orifice 100 in an exit cone 110. The exit orifice allows ions within the common exit channel 90 to pass therethrough and into a mass spectrometer (not shown).

The common exit channel 90 opens into a pumping chamber 120 to which is connected a vacuum pump, typically a rotary pump (not shown). In this manner, the pressure in the interface chamber 80, between the entrance orifices 40 and the exit orifice 100, is maintained below atmospheric pressure, typically around 10 to 15 mBar.

In prior art ion sources having only a single entrance orifice such as are described in WO 98/49710, although the pressure at the exit orifice is about 10 to 15 mBar, the slow rate of gas flow means that the pressure on the pump is only about 1 mBar. In the system of WO 98/49710, a small restrictor is used to reduce pump efficiency and to maintain the required pressure. The same pump can then also be used as a backup pump to the more powerful turbo pumps which maintain the mass spectrometer at an even lower pressure (typically about $10^{-4}$ mBar).

In a preferred embodiment of the present invention, the restrictor is removed to offset the increased gas flow rate caused by the introduction of a plurality of entrance orifices 40. In this way, the required pressure in the interface chamber 80 may be maintained without the introduction of a second vacuum pump. However, it may be necessary for a system having 8 to 10 entrance orifices 40, for example, to provide a further, lower pumping speed pump to act as a backup to the turbo pumps.

Figure 2:
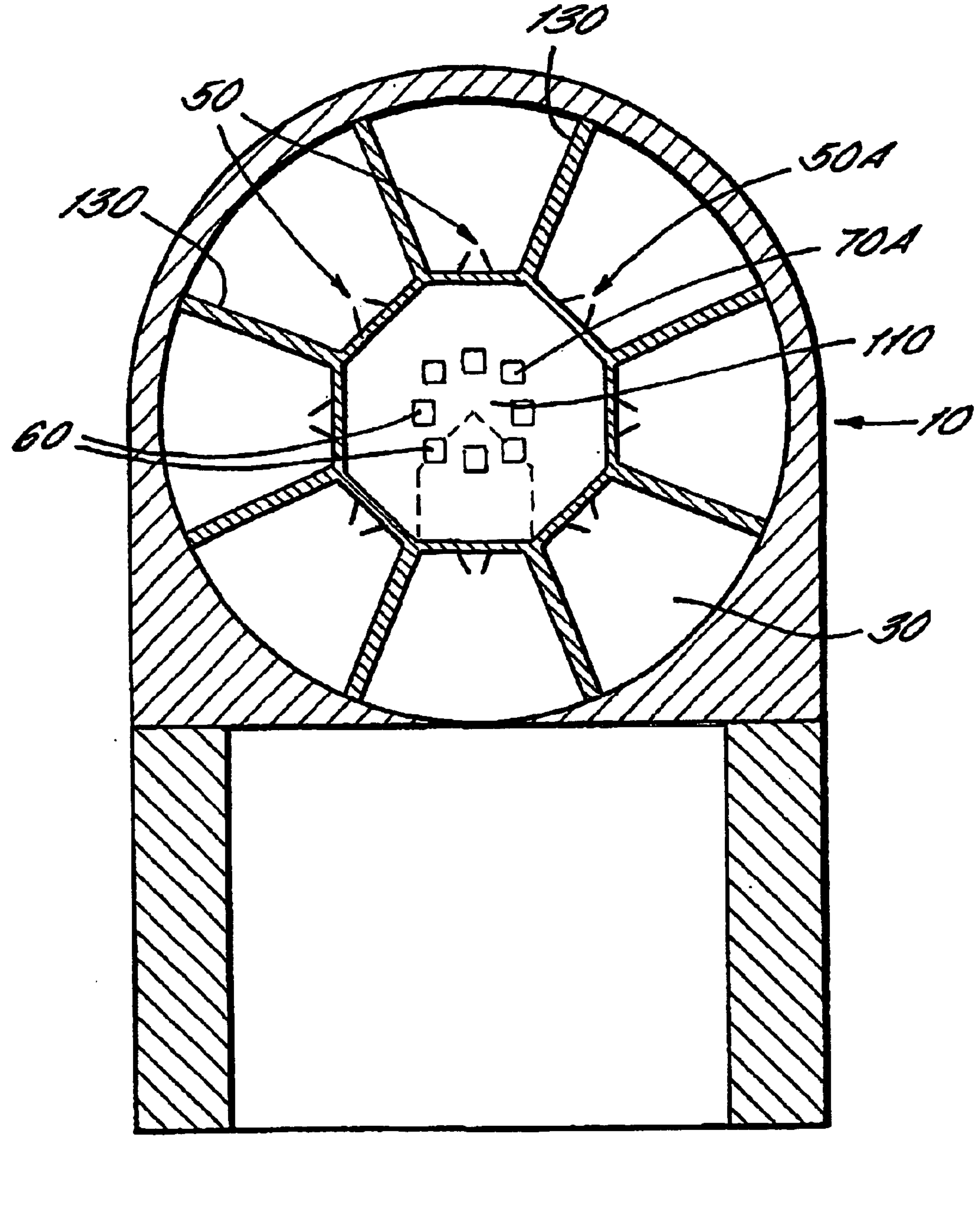
FIG. 2 shows a section along the line AA' of FIG. 1.

Turning now to FIG. 2, a section along the line AA' of FIG. 1 is shown. FIG. 2 illustrates the layout of the plurality of inlet channels and entrance cones which are fed by the corresponding plurality of ionisers. As seen in that Figure, eight inlet channels are arranged in a circle, to allow samples from eight different ionisers to be received. Each entrance cone 50 receives samples from a corresponding sample ioniser, and these pass into a corresponding first part 60 of a corresponding inlet channel. For example, the entrance cone labelled 50A opens into a first part (not shown in FIG. 2) of the inlet channel. This in turn leads into a second part 60A of the inlet channel. Adjacent inlet channels are separated by ribs 130.

As may be appreciated through considering FIGS. 1 and 2 in combination, the second parts 70 of the separate inlet channels converge at a relatively shallow angle, meeting at the common exit channel 90. Thus, the eight second parts 70 of the inlet channel together form a frustoconical shape. The shallow angle between the inlet channels and the common exit channel 90 prevents excessive turbulence in ions as they approach the exit orifice 100.

In use, each of the eight ionisers 20 typically supplies different sample ions. However, it is to be appreciated that at least some of the ionisers may in fact receive the same sample from the liquid chromatograph (for example). This could improve the sensitivity of the device.

In contrast to prior art devices, each of the ionisers 20 generates sample ions continuously, rather than being switched on and off as required. Thus, ions from each of the separate ionisers travel through the corresponding entrance orifices 40 in the entrance cone 50 corresponding to that particular ioniser. The different sample ions then travel down their own, separate inlet channels. In other words, absent an electrical gate 65 in each inlet channel, all eight different samples would arrive continuously, together, at the exit orifice 100.

The electrical gate 65 in each inlet channel is, as previously described in connection with FIG. 1, located at the junction between the first part 60 and the second part 70 thereof. In the exemplary embodiment of FIG. 1, the electrical gate 65 is formed from an electrode which is capable of generating an electric field of suitable magnitude to deflect the sample ions passing down the first part 60 of the inlet channel, onto the wall of the interface chamber 80. This prevents them from passing along the second part 70 of the inlet channel and into the common exit channel 90.

Each of the eight electrodes mounted, separately, in the eight inlet channels, is connected to a common controller. This allows a user to determine which of the samples is to be allowed to pass along the length of the inlet channel and into the common exit channel 90. In one mode, the electrodes are manually switchable such that, at a given time, the electrical gates 65 in seven of the eight inlet channels are "closed", and only one of the electrical gates 65 is "open". In a second mode, the controller may automatically switch the electrical gates 65 in rapid succession such that successively different samples are admitted into the common exit channel 90. In yet a further mode, two or even more of the electrical gates 65 may be open simultaneously. This would be useful, for example, when species from separate flows are known not to interfere in the mass spectrum and therefore the duty cycle could be increased.

The bend in the inlet channel at the junction between the first and second parts thereof serves two purposes. Firstly, it avoids the presence of a direct line of sight between any of the entrance orifices 40 and the single exit orifice 100. This prevents "streaming" of sample ions from the entrance to the exit orifices, which is advantageous. Secondly, by locating the electrode to generate the electrical gate 65 at that junction, the electric field shape is particularly efficient in preventing ions from travelling through the inlet channel when the electrical gate 65 is closed.

Although all eight ionisers 20 may provide ions from a sample to be examined, it is preferable that one of the ionisers 20 is instead provided with a flow of solvent containing molecules which, when ionised, have a known mass/charge ratio. This is particularly useful to allow a mass spectrometer in communication with the exit orifice 100 to be calibrated. In this case, the inlet channel fed by the calibration ioniser is typically left open (that is, the electrical gate 65 in that channel is opened) whilst a sample to be analysed (from another of the ionisers) is admitted at the same time.

Gating of the different inlet channels allows for any combination of the different streams of sample ions to be mass analysed. Further, the high speed electrical gating enables fast switching from one stream of sample ions to the next, increasing the speed of analysis by the mass spectrometer. Typically, the interface chamber 80 is maintained at a pressure of around 10 to 15 mBar. Accordingly, the sample ions in the inlet channel are typically travelling at speeds of over 100 m/s in comparison to speeds of around 10 m/s in the relatively higher pressure sample region 30 surrounding the entrance orifice 40. With this increased speed of travel, when one of the electrical gates 65 is open, the relaxation time before the sample ions reach the exit orifice 100 is considerably shorter than in the prior art. This increases the switching speed, and hence the speed of analysis by the mass spectrometer, yet further.

Although a preferred embodiment of the invention has been described, it is to be understood that various modifications or alternatives are contemplated. In particular, any number of sample ionisers 20, together with a corresponding number of entrance cones 50 and inlet channels, may be included, and these may be arranged in any suitable configuration. However, increasing the number of entrance orifices 40 will increase the pressure in the interface chamber 80 for a given pumping speed.

Furthermore, although in the preferred embodiment an electrical gate 65 is employed in each inlet channel, at the junction between the first and second parts thereof, it would be appreciated that different techniques may be used for gating or blocking the ions. For example, a mechanical gate such as a shutter valve could be used in place of an electrical gate generated by an electrode, to block the flow of sample ions through each inlet channel. Furthermore, rather than using a static electric field, it may be advantageous under certain circumstances to employ an RF field instead.

Figure 3:
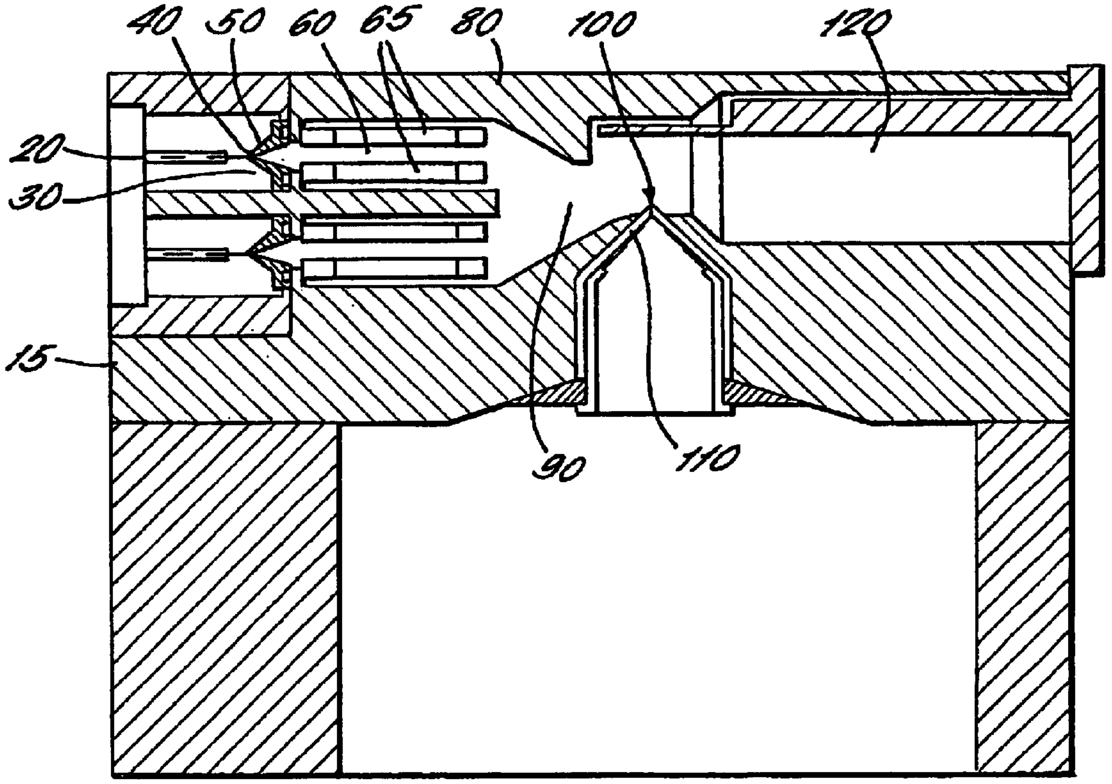
FIG. 3 shows a side cross-sectional view of an alternative ion source embodying the present invention.

In an alternative embodiment of the present invention, shown in FIGS. 3 and 4, instead of a plurality of electrical or electrically-operated mechanical gates, the multiple ion paths from the ionisers via the interface chamber to the mass spectrometer may instead be selectively blocked by a plurality of rf-only multipole storage devices (such as a quadrupole or hexapole arrangement). These are of themselves well known and are shown, for example, in U.S. Pat. Nos. 5,420,425, 6,020,586 and 5,179,278.

Referring to FIG. 3, two of a plurality of sample ionisers 20 (e.g. nanosprays) are shown, each extending into a corresponding sampling region 30, and pointing directly at an associated entrance orifice 40 of an entrance cone 50. It will be understood that, as with previous embodiments, each sample ioniser 20 may be arranged at right-angles to its associated entrance orifice 40. Each entrance cone 50 communicates with a corresponding inlet channel 60, defining an ion path.

Electrodes of an rf-only multipole ion trap 65 are shown arranged around each inlet channel 60. Preferably, one rf-only ion trap 65 is positioned in a corresponding one of the ion paths between the entrance orifices 40 and the exit orifice 100, that is, a separate storage device 65 is provided for each ion stream within the multipole arrangement.

The common exit channel 90 opens into a pumping chamber 120 to which is connected a vacuum pump, typically a rotary pump (not shown).

During operation, the ions from a given ioniser 20, passing along the corresponding inlet channel 60, are focussed onto the axis of the ion trap 65 associated with that inlet channel 60, even at relatively high pressures (several mBar). Ions may be trapped in each ion trap 65 by applying a voltage to the end apertures or end-sections thereof and the storage time may be up to a few seconds. Once trapped, ions may be ejected by altering the ion trap parameters when desired. Thus, in a directly analogous manner to the use of electrical or mechanical gates, ion traps 65 can simultaneously or sequentially supply a single stream of ions to a mass spectrometer from a multiple sample stream input. The advantage of this arrangement over the electrical/mechanical gating technique is that the ion traps should provide a 100% duty cycle. This in turn permits higher sensitivity to be achieved.

What is claimed is:

1. An ion source for a mass spectrometer which operates at low pressure, the ion source comprising:

a plurality of sample ionisers operative at atmospheric pressure to provide a plurality of streams of sample ions;

an interface chamber, operable at a pressure lower than atmospheric pressure, having a plurality of entrance orifices located at a first position to collect sample ions into the interface chamber from said streams of sample ions and an exit orifice at a second position downstream of the said first position of the entrance orifices, for said sample ions to exit the interface chamber to the mass spectrometer, the interface chamber defining a plurality of separate ion paths for ions to travel between a respective one of the entrance orifices and the exit orifice, wherein each entrance orifice and the associated ion path are physically separated from the other entrance orifices and ion paths along at least a portion of each of the ion paths; and ion control means, located downstream of the said entrance orifices, and arranged selectively to prevent ions from passing along a chosen one or ones of the ion paths to the mass spectrometer.

2. An ion source as claimed in claim 1, wherein the interface chamber further comprises an evacuation port and a vacuum pump connected to the evacuation port to maintain the interface chamber at said pressure lower than atmospheric pressure.

3. An ion source as claimed in claim 1, in which the ion control means includes gating means which, when open, permits passage of a selected one or ones of streams of sample ions to the mass spectrometer, the gating means being provided within the interface chamber between the said first and second positions.

4. An ion source as claimed in claim 3, in which the gating means comprises an electromagnetic field generator arranged selectively to generate an electromagnetic field which deflects the selected one or ones of said streams of sample ions so as to prevent the or each said stream of sample ions from entering the mass spectrometer.

5. An ion source as claimed in claim 4 wherein the electromagnetic field generator generates a static electric field.

6. An ion source as claimed in claim 3, in which the interface chamber defines a plurality of interface channels each in communication with a corresponding one of the entrance orifices, each interface channel in turn constraining a corresponding one of the said streams of sample ions to follow a corresponding one of the said ion paths.

7. An ion source as claimed in claim 6, in which the interface chamber further defines a single exit channel in communication with the exit orifice, the plurality of interface channels each converging into the single exit channel.

8. An ion source as claimed in claim 6, in which the gating means comprises a plurality of individual gates, each gate being associated with a corresponding individual interface channel and being arranged selectively to block a corresponding stream of sample ions, deriving from a corresponding one of the plurality of entrance orifices, from entering the mass spectrometer.

9. An ion source as claimed in claim 8, in which each gate extends across its corresponding interface channel in use, so as selectively to block ions passing along that interface channel.

10. An ion source as claimed in claim 1, in which the ion control means comprises ion trapping means arranged selectively to prevent ions entering it from exiting therefrom.

11. An ion source as claimed in claim 10, in which the interface chamber defines a plurality of interface channels each in communication with a corresponding one of the entrance orifices, each interface channel in turn constraining a corresponding one of the said streams of sample ions to follow a corresponding one of the said ion paths.

12. An ion source as claimed in claim 11, in which the ion trapping means comprises a plurality of ion storage devices each being arranged to receive a stream of sample ions from a corresponding one of the said separate ion paths and selectively to trap the received stream therein for future ejection to the exit orifice on demand.

13. An ion source as claimed in claim 12, in which each ion storage device comprises an if multipole ion storage device.

14. An ion source as claimed in claim 6, in which at least some of the interface channels are adapted so as to prevent a direct line of sight between their corresponding entrance orifice and the said exit orifice.

15. An ion source as claimed in claim 14, in which the interface channels include a bend therein.

16. An ion source as claimed in claim 15, in which each gate is located adjacent to the bend in the corresponding interface channel.

17. An ion source as claimed in claim 1 wherein at least one of said plurality of sample ionisers provides a stream of ions for calibrating the mass spectrometer, said stream of ions for calibrating the mass spectrometer being admitted to the mass spectrometer simultaneously with at least one other of said streams of sample ions.

18. An ion source as claimed in claim 1, wherein the interface chamber is arranged in fixed relation to the sample ionisers.

19. An ion source as claimed in claim 1, wherein the mass spectrometer is in communication with said exit orifice of the ion source.

20. An ion source as claimed in claim 3, in which the gating means comprises plurality of electrically operated mechanical gates.

21. A method of analysing sample ions from at least one of a plurality of simultaneously operating atmospheric pressure sample ionisers, the method comprising:

generating a stream of sample ions from each of a corresponding one of the plurality of atmospheric pressure sample ionisers;

directing each stream towards a corresponding one of a plurality of entrance orifices in an interface chamber, maintained at a pressure below atmospheric pressure, for selective direction through the interface chamber along respective separate ion paths defined by the interface chamber to travel between a respective one of the entrance orifices and an exit orifice towards a mass spectrometer; and selectively blocking at least some of said streams of sample ions from passing through said exit orifice of said interface chamber into the mass spectrometer after said selected one or ones of said streams of sample ions have entered said interface chamber, wherein selectively blocking the at least some of said streams of sample ions does not affect streams of sample ions that are not to be blocked.

22. A method as claimed in claim 21, wherein the mass spectrometer is operative at a low pressure, the method further comprising maintaining the pressure within the interface chamber at a pressure intermediate atmospheric pressure and the operating pressure of the mass spectrometer.

23. A method as claimed in claim 21, wherein said step of selectively blocking at least some of said streams of sample ions comprises generating an electromagnetic field for deflecting selected one or ones of said streams of sample ions so as to prevent the or each said stream from reaching the mass spectrometer.

24. A method as claimed in claim 23 wherein said step of generating an electromagnetic field comprises generating a static electric field.

25. A method as claimed in claim 21,in which the step of selectively blocking at least some of the streams of sample ions comprises trapping selected ones of the said streams in a corresponding one of a plurality of ion traps.

26. A method as claimed in claim 25, further comprising subsequently ejecting ions stored in a selected one or ones of the said ion traps and directed the ejected ions towards the mass spectrometer.

27. A method as claimed in claim 21 further comprising providing a stream of ions for calibrating the mass spectrometer and admitting said stream of ions for calibrating the mass spectrometer to the mass spectrometer simultaneously with at least one other of said streams of sample ions.

28. A method as claimed in claim 21, further comprising supplying at least two of the plurality of atmospheric pressure sample ionisers with the same sample to be ionized.

29. A method as claimed in claim 21, wherein the interface chamber is arranged in fixed relation to the sample ionisers.

* * * * *